United States Patent
Linden et al.

(10) Patent No.: US 11,565,184 B1
(45) Date of Patent: Jan. 31, 2023

(54) SYSTEMS AND METHODS FOR LINKING PHYSICAL ITEMS TO VIRTUAL CONTENT

(71) Applicant: Mythical, Inc., Sherman Oaks, CA (US)

(72) Inventors: John Linden, Sherman Oaks, CA (US); Cameron Thacker, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 355 days.

(21) Appl. No.: 16/820,475

(22) Filed: Mar. 16, 2020

(51) Int. Cl.
- *A63F 13/70* (2014.01)
- *A63F 13/60* (2014.01)
- *G06Q 20/22* (2012.01)
- *G06Q 20/06* (2012.01)

(52) U.S. Cl.
CPC .............. *A63F 13/70* (2014.09); *A63F 13/60* (2014.09); *G06Q 20/06* (2013.01); *G06Q 20/223* (2013.01)

(58) Field of Classification Search
CPC ................................ A63F 13/70; A63F 13/60
See application file for complete search history.

(56) References Cited

U.S. PATENT DOCUMENTS

| | | |
|---|---|---|
| 6,591,250 B1 | 7/2003 | Johnson |
| 8,972,369 B2 | 3/2015 | Vignocchi |
| 9,430,791 B1 | 8/2016 | Sutton-Shearer |
| 11,062,284 B1 | 7/2021 | Cunningham |
| 11,154,783 B1 | 10/2021 | Koch |
| 2009/0276332 A1 | 11/2009 | Gharabally |
| 2011/0302037 A1 | 12/2011 | Sutton-Shearer |
| 2014/0094283 A1 | 4/2014 | Sanford |
| 2015/0310476 A1 | 10/2015 | Gadwa |
| 2016/0098723 A1 | 4/2016 | Feeney |
| 2016/0140653 A1 | 5/2016 | McKenzie |
| 2016/0292680 A1 | 10/2016 | Wilson, Jr. |
| 2016/0325180 A1 | 11/2016 | Nelson |
| 2017/0052676 A1* | 2/2017 | Pulier ................ G06F 3/04883 |
| 2017/0127216 A1* | 5/2017 | Coyne ..................... H04W 4/50 |
| 2017/0206523 A1 | 7/2017 | Goeringer |
| 2018/0062848 A1 | 3/2018 | Gorman |
| 2018/0255090 A1 | 9/2018 | Kozloski |

(Continued)

OTHER PUBLICATIONS

Koch, Rudy; "Introducing dGoods", Feb. 10, 2019 (Year: 2019).

(Continued)

*Primary Examiner* — Neha Patel
*Assistant Examiner* — Courtney P Jones
(74) *Attorney, Agent, or Firm* — Esplin & Associates, PC

(57) ABSTRACT

Systems and methods for linking physical items to virtual content. Exemplary implementations may: receive a first request to verify whether a first activation of a first item has occurred; if not, transmit a notification in reply to the first request; receive, from a first user, a second request to effectuate the first activation of the first item and to make particular virtual content accessible to the first user; modify state of a smart contract on a decentralized database such that subsequent requests confirm the first activation has occurred; establish a link between the first item and the first user such that the particular virtual content is accessible to the first user; and responsive to the particular virtual content being accessible to the first user, transmit a second notification in reply to the second request.

20 Claims, 4 Drawing Sheets

(56) References Cited

U.S. PATENT DOCUMENTS

| | | |
|---|---|---|
| 2019/0205894 A1 | 7/2019 | Gonzales, Jr. |
| 2019/0299105 A1* | 10/2019 | Knight ................ G07F 17/3251 |
| 2020/0184547 A1* | 6/2020 | Andon ................... H04W 4/00 |
| 2020/0294011 A1 | 9/2020 | Robertson |
| 2021/0174625 A1 | 6/2021 | Pinkerton |
| 2021/0201336 A1 | 7/2021 | Mallett |
| 2021/0217001 A1* | 7/2021 | Harrison ............. G06Q 20/401 |

OTHER PUBLICATIONS

Brightman, James; "Activision Blizzard Vets Launch Mythical Games With Focus on Player-Owned Economies"; GameDaily.biz, 1 1 Jun. 2018. (Year: 2018).

Business Wire; "Mythical Games Announces integration of Microsoft Azure Blockchain Tokens with dGoods Standard"; Bloomberg, 1 Jan. 6, 2019. (Year: 2019).

\* cited by examiner

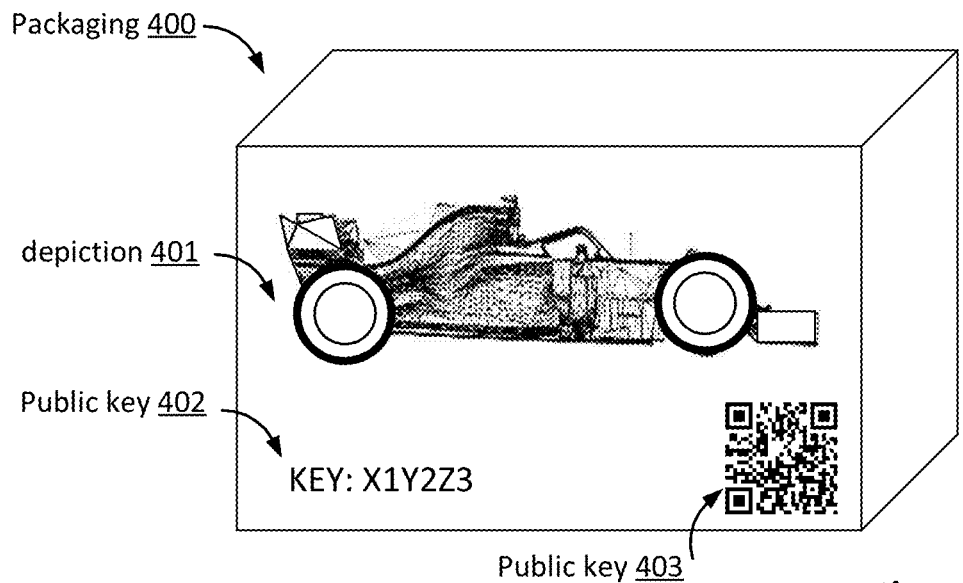
Fig. 4A
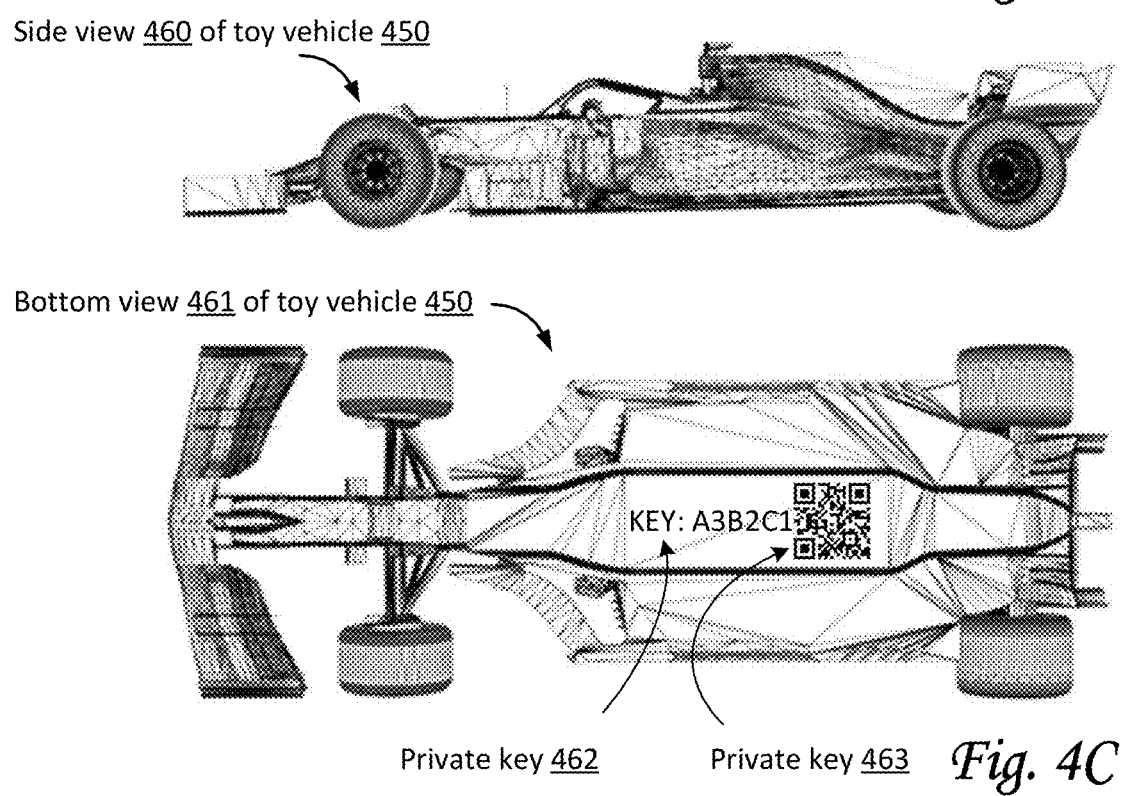
Fig. 4B
Fig. 4C

SYSTEMS AND METHODS FOR LINKING PHYSICAL ITEMS TO VIRTUAL CONTENT

FIELD OF THE DISCLOSURE

The present disclosure relates to systems and methods for linking physical items to virtual content.

BACKGROUND

Gaming platforms often implement various techniques to keep users engaged, such as offering items or merchandise for purchase that are associated with the gaming platform, encouraging collaborative play between users, providing incentives to users, and/or other techniques.

SUMMARY

One aspect of the present disclosure relates to a system configured for linking physical items to virtual content, wherein the physical items include a first item. The system may include one or more hardware processors configured by machine-readable instructions. The processor(s) may be configured to store information. The stored information may include an association between the first item and particular virtual content that is usable to one or more users in the online gaming platform upon a first activation of the first item. The first item may be associated with a pair of (alphanumerical) keys. The pair of keys may include a public key and a private key. The public key may be visually publicly available. The private key may be not visually publicly available. The private key may be available to an owner of the first item. The first activation may be based on the private key. The processor(s) may be configured to manage user accounts for the users in the online gaming platform. Individual ones of the user accounts may be associated with individual ones of the users. The individual ones of the user accounts may include individual user inventories of virtual items that are usable within the online gaming platform by the individual ones of the users. The users may include a first user. The first user may be associated with a first user account. The first user account may include a first user inventory of one or more virtual items that are usable by the first user within the online gaming platform. The processor(s) may be configured to receive a first request to verify whether the first activation of the first item has occurred. The first request may include the public key. The processor(s) may be configured to determine whether the first activation of the first item has occurred. Determination may include accessing a smart contract on a decentralized database. The processor(s) may be configured to, responsive to a determination that the first activation of the first item has not occurred, transmit a notification in reply to the first request. The notification may indicate that the first activation of the first item has not occurred. The processor(s) may be configured to receive, from the first user, a second request to effectuate the first activation of the first item and to make the particular virtual content accessible to the first user. The second request may include the private key. The processor(s) may be configured to modify state of the smart contract on the decentralized database such that subsequent requests to verify whether the first activation of the first item has occurred will be replied to with notifications that indicate the first activation has occurred. The processor(s) may be configured to establish a link between the first item and the first user such that the particular virtual content is accessible to the first user. Establishment of the link may be based on the association between the first item and the particular virtual content. The processor(s) may be configured to, responsive to the particular virtual content being accessible to the first user, transmit a second notification in reply to the second request. The second notification may indicate the particular virtual content is accessible to the first user.

Another aspect of the present disclosure relates to a method for linking physical items to virtual content, wherein the physical items include a first item. The method may include storing information. The stored information may include an association between the first item and particular virtual content that is usable to one or more users in the online gaming platform upon a first activation of the first item. The first item may be associated with a pair of (alphanumerical) keys. The pair of keys may include a public key and a private key. The public key may be visually publicly available. The private key may be not visually publicly available. The private key may be available to an owner of the first item. The first activation may be based on the private key. The method may include managing user accounts for the users in the online gaming platform. Individual ones of the user accounts may be associated with individual ones of the users. The individual ones of the user accounts may include individual user inventories of virtual items that are usable within the online gaming platform by the individual ones of the users. The users may include a first user. The first user may be associated with a first user account. The first user account may include a first user inventory of one or more virtual items that are usable by the first user within the online gaming platform. The method may include receiving a first request to verify whether the first activation of the first item has occurred. The first request may include the public key. The method may include determining whether the first activation of the first item has occurred. Determination may include accessing a smart contract on a decentralized database. The method may include, responsive to a determination that the first activation of the first item has not occurred, transmitting a notification in reply to the first request. The notification may indicate that the first activation of the first item has not occurred. The method may include receiving, from the first user, a second request to effectuate the first activation of the first item and to make the particular virtual content accessible to the first user. The second request may include the private key. The method may include modifying state of the smart contract on the decentralized database such that subsequent requests to verify whether the first activation of the first item has occurred will be replied to with notifications that indicate the first activation has occurred. The method may include establishing a link between the first item and the first user such that the particular virtual content is accessible to the first user. Establishment of the link may be based on the association between the first item and the particular virtual content. The method may include, responsive to the particular virtual content being accessible to the first user, transmitting a second notification in reply to the second request. The second notification may indicate the particular virtual content is accessible to the first user.

As used herein, any association (or relation, or reflection, or indication, or correspondency) involving servers, processors, client computing platforms, users, accounts, inventories, physical items, keys, virtual content, activations, requests, notifications, determinations, contracts, links, and/or another entity or object that interacts with any part of the system and/or plays a part in the operation of the system, may be a one-to-one association, a one-to-many association, a many-to-one association, and/or a many-to-many association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4A illustrates an exemplary packaging for a toy vehicle as may be used by a system configured for linking physical items to virtual content, in accordance with one or more implementations.

FIG. 4B illustrates a side view of a toy vehicle as may be used by a system configured for linking physical items to virtual content, in accordance with one or more implementations.

FIG. 4C illustrates a bottom view of a toy vehicle as may be used by a system configured for linking physical items to virtual content, in accordance with one or more implementations.

DETAILED DESCRIPTION

Figure 1:
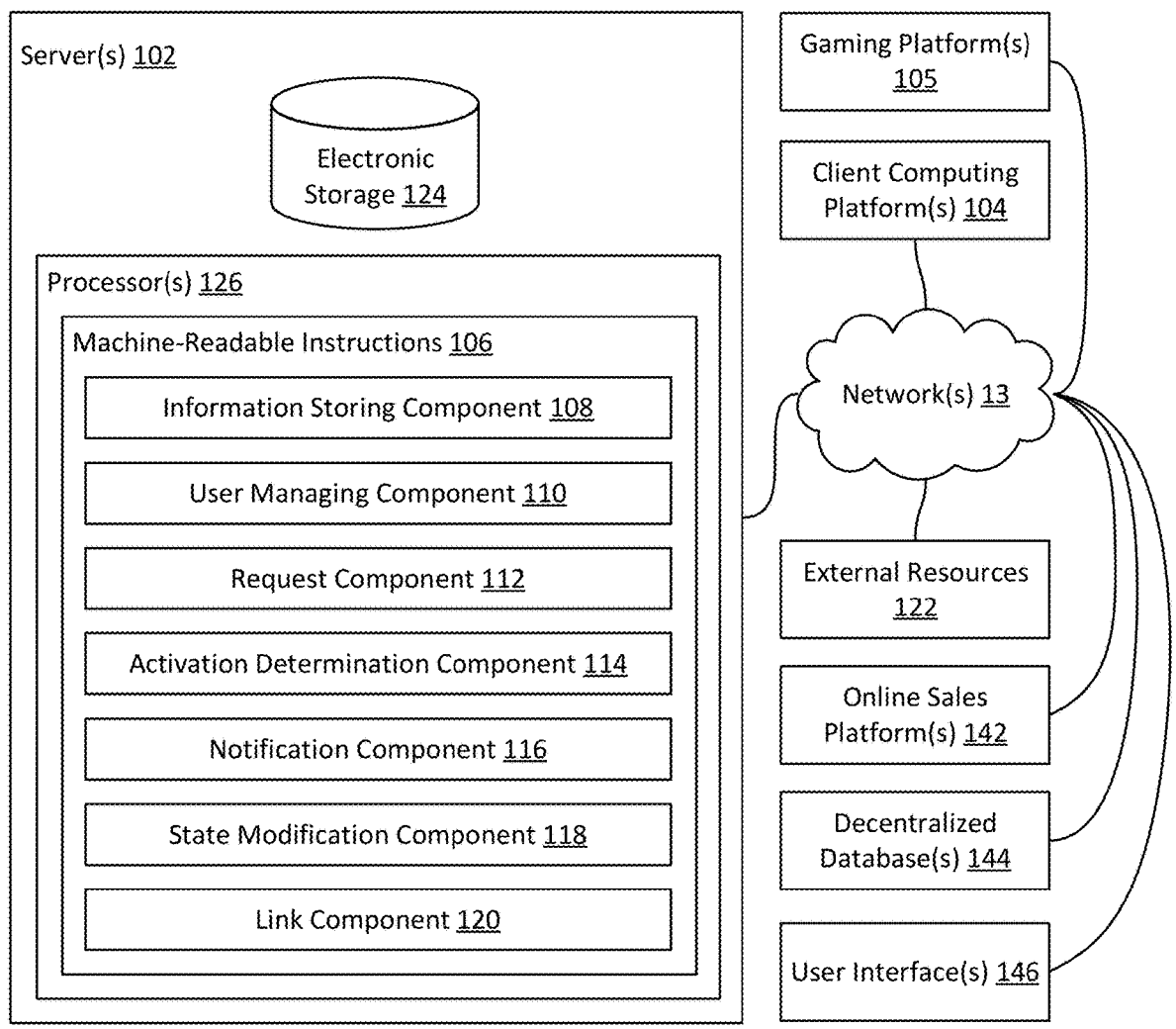
FIG. 1 illustrates a system configured for linking physical items to virtual content, in accordance with one or more implementations.

FIG. 1 illustrates a system 100 configured for linking physical items to virtual content, in accordance with one or more implementations. By way of non-limiting example, the physical items may include a playing card, a toy, a figurine, a coin, and/or other real-world physical items. The physical items may include a first item, a second item, and so forth. Virtual content may be (collections and/or packages of) virtual items usable within an online gaming platform, such as gaming platform 105. By way of non-limiting example, the virtual items may include one or more of weapons, toys, characters, abilities, skills, tools, pets, clothing, vehicles, game levels, missions, assignments, chapters, tasks, mini-games, restricted areas within a virtual space, access rights within an online game, and/or other virtual items. In some implementations, virtual items may refer to any item or object within gaming platform 105 that a user may use, own, sell, trade, destroy, and/or otherwise effectuate a change of ownership of. An owner of a particular physical item (e.g., the first owner who purchases and/or otherwise obtains the particular physical item) may be able, through the features described in this disclosure, to activate the particular physical item and subsequently unlock (or effectuate the unlocking of) particular virtual content that is associated with the particular physical item. As used herein, the term activate and derivatives thereof may be used to indicate that a physical item has been used in a transaction or process by which particular virtual content is made available to one or more particular users. The term unlock and derivatives thereof may be used to indicate that particular virtual content has been made accessible and/or available to one or more particular users, whereas this particular virtual content was not accessible and/or available to these users prior to the unlocking. The terms activate and unlock may be related as follows: activation refers to the realm of physical items (e.g., a physical item may be activated or not activated), and unlocking refers to the virtual realm (e.g. certain virtual content may be locked or unlocked). Certain physical items are associated to certain virtual content such that activating the physical items refers to the transaction or process by which associated virtual content is made accessible and/or available. For example, given virtual content may not be unlocked and as a result not be not accessible to (particular) users prior to the particular physical item being activated. Upon such activation, at least a given user (and perhaps other users as well) may subsequently access and/or use the given virtual content. In some implementations of unlocking, in the case of a virtual object, the virtual object may be added to the given user's inventory of virtual items within gaming platform 105. In some implementations of unlocking, in case of a more ephemeral and/or intangible type of virtual content such as the right to access a restricted area within a virtual space of gaming platform 105, the given user may be able to travel within the virtual space to an area that was previously restricted from use by the given user (while simultaneously allowing or restricting access to one or more other users). For example, the pertinent area may become visible and/or otherwise change within a map and/or other depiction of the virtual space as presented to the given user.

By way of non-limiting example, the particular physical item may be a toy vehicle, which may be wrapped in physical packaging (e.g., a container and/or other type of package). The toy vehicle may be purchased in a store (and/or otherwise legally obtained) by a particular user, who may subsequently use (information included in) one or both of the packaging and/or the toy vehicle to activate the toy vehicle and subsequently unlock particular virtual content (e.g., a virtual vehicle similar in appearance to the toy vehicle) for use within gaming platform 105. In some implementations, the particular virtual content may only be unlocked one time. In such a case, it would be important that anyone can verify (through a trustworthy mechanism such that its integrity is unlikely to be compromised) whether a particular physical item has already been activated (e.g., by another user). In some implementations, the particular user may be able to sell and/or trade the particular virtual content to another user. In other implementations, the particular user may not be able to sell and/or trade the particular virtual content to another user. In some implementations, other users may not be able to activate the particular physical item a second time.

System 100 and/or its components may be configured to communication with client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. The users may include a first user, a second user, a third user, and so forth. The first user may be associated with a first client computing platform, the second user may be associated with a second client computing platform, and so forth.

In some implementations, system 100 may include one or more servers 102. Server(s) 102 may be configured to communicate with one or more (online) gaming platform(s) 105, game operator(s), decentralized database(s) 144, and/or other components via one or more network(s) 13. As used herein, gaming platform 105 may refer to either an individual game, a type of gaming console and its ecosystem, and/or any combination of these. Gaming platform 105 may include one or more (online) games. As used herein, the phrase "game operator" may refer to a host, operator, owner, and/or other stakeholder of gaming platform 105. Gaming platform 105 may include users accounts associated with users. In some implementations, individual physical items may be linked and/or otherwise connected with individual user accounts of online gaming platform 105 (e.g., upon activation). In some implementations, individual elements of virtual content may be linked and/or otherwise connected with individual user accounts of online gaming platform 105 (e.g., upon unlocking). In some implementations, gaming platform 105 may be configured to execute an instance of an online game and implement the instance of the online game by receiving and executing commands (or requests). The commands may be received from users through client computing platforms 104 associated with the users. By way of non-limiting example, execution of the commands may facilitate interactions between the users, and to determine view information for presentation of the online game to the users on client computing platforms 104. In some implementations, gaming platform 105 may be configured to execute and implement an instance of the online game in a virtual space. The virtual space may include one or more of a multi-dimensional space, a two-dimensional space, a three-dimensional space, and/or another virtual space. An instance of the virtual space may include virtual space content determined based on individual virtual space content associated with individual objects and the arrangement(s) of the objects, and/or other information. In some implementations, the instance of the virtual space may include a simulated space that is accessible by the users. The simulated space may have a topography, express ongoing real-time interaction by one or more users, and/or include one or more objects positioned within the simulated topography that are capable of locomotion within the simulated topography. The simulated topography may include surface features of a surface or objects that are "native" to the space. In some instances, the simulated topography may describe a surface (e.g., a ground surface) that runs through at least a substantial portion of the space. In some instances, the simulated topography may describe a volume with one or more bodies and/or objects presented therein (e.g., celestial bodies).

In some implementations, gaming platform 105 may use the instance of the virtual space to facilitate presentation of one or more views of the virtual space to a user. Gaming platform 105 may use the instance of the virtual space to enable a user to interact with the virtual space. In some implementations, the execution of the instance of the virtual space may include gaming platform 105 executing an instance of a game within the virtual space. Gaming platform 105 may be configured to receive user commands and/or requests to initiate actions at locations within the simulated topography of the virtual space. For example, a user request to initiate an action in the virtual space may specify an action type associated with the requested action. The action type may be used to obtain a function, method, routine, formula, software component or components, and/or any other means that may be used to execute the requested action. A user request to initiate an action may also specify one or more virtual space objects and/or characters to be acted on. Gaming platform 105 may be configured to execute user-requested actions at virtual space locations in an instance of the virtual space. The virtual space locations may include, but not limited to, areas and/or locations appropriate for the virtual space.

In some implementations, gaming platform 105 may be configured to receive user commands and/or requests to participate in activities in the virtual space and execute those activities. The user-requested activities may include, but is not limited to, initiating virtual space transactions, partaking in a game, miss ion, quest, campaign, expedition, training, tutorial, research and/or so on in the virtual space, consulting a virtual space expert, messaging other users, convening, and/or any other virtual space activities. The disclosure of the virtual space is not intended to be limiting. The virtual space may be presented in a more limited or richer manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by gaming platform 105, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency that the user can use (e.g., by manipulation of a user character or other user-controlled element, and/or other items) within the virtual space.

In some implementations, the users may participate in the instance of the virtual space by controlling one or more of the available user-controlled elements in the simulated topography of the virtual space. Control may be exercised through control inputs, commands, and/or other requests provided by the users through client computing platforms 104. For example, the commands provided by the user may specify an action involving user-controlled elements at a particular virtual space location. Such a user-initiated action in the virtual space may change the state of the virtual space at an instance when the action is executed in the virtual space. Such a user-initiated action in the virtual space may change views of the virtual space when the action is executed in the virtual space. In some implementations, the execution of commands may facilitate locomotion of user-controlled objects within the simulated topography of the virtual space. The view information may include a depiction of the user-controlled objects within the simulated topography of the virtual space.

In some implementations, decentralized database 144 (e.g., a blockchain or another structure of blocks) may be maintained by a distributed computing platform (not shown in FIG. 1). In some implementations, the distributed computing platform may be implemented by a set of client computing platforms and/or computing platforms. The distributed computing platform may support a virtual machine (not shown in FIG. 1). The distributed computing platform and/or the virtual machine may form a runtime environment for smart contracts. In some implementations, the distributed computing platform may include electronic storage configured to store part or all of decentralized database 144. The smart contracts may be stored on decentralized database 144. In some implementations, the distributed computing platform may be Ethereum. In some implementations, the distributed computing platform may be the EOSIO platform. In some implementations, the virtual machine may be decentralized.

Decentralized database 144 may act as storage for a registry of assets and transactions across one or more networks 13. A given asset may be owned by a particular user. An asset may include anything of material value or usefulness that is owned by or on behalf of a person or company, according to some implementations. A right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights.

In some implementations, decentralized database 144 may record ownership of assets. Alternatively, and/or simultaneously, decentralized database 144 may record transactions that modify ownership of assets. A smart contract may be a type of asset. In some implementations, once a smart contract has been added to the distributed ledger, the smart contract may be referred to as published, recorded, and/or posted. In some implementations, smart contracts may be used to track whether physical items have been activated, by whom the physical items have been activated, whether virtual content has been unlocked, by whom the virtual content has been unlocked, associations and/or other connections between physical items and virtual content, and/or other information of use to systems configured to link physical items to virtual content.

Elements of decentralized database 144 may be grouped together in units that are referred to as blocks. For example, an individual block may include one or more assets and one or more transactions. Decentralized database 144 may be publicly accessible and append-only. In some implementations, existing blocks of a distributed ledger can substantially not be altered or deleted, unless multiple copies of the distributed ledger are altered. This is unlikely to happen provided that multiple copies of the distributed ledger are stored on different computing platforms, e.g., in different geographical locations. The distributed ledger may be replicated (in part or in its entirety) on multiple computing platforms, preferably in multiple different geographical locations.

Server(s) 102 may be configured by machine-readable instructions 106. Machine-readable instructions 106 may include one or more instruction components. The instruction components may include computer program components. The instruction components may include one or more of information storing component 108, user managing component 110, request component 112, activation determination component 114, notification component 116, state modification component 118, link component 120, and/or other instruction components.

Information storing component 108 may be configured to store information, e.g., in electronic storage 124. The stored information may include associations between physical items and virtual content. In some implementations, particular virtual content may be unlocked and/or otherwise usable to one or more users in gaming platform 105 upon activation of the associated particular physical items. For example, the stored information may include a first association, a second association, a third association, and so forth. In some implementations, the stored information may include some or all of the virtual content. In some implementations, by way of non-limiting example, particular virtual content may include one or both of a virtual item usable within online gaming platform 105 and an activity, event, or area within a virtual space of online gaming platform 105.

In some implementations, individual physical items may be associated with pairs of keys. As used herein, a key represents particular functional information, which may be physically manifested in various ways, including but not limited to a barcode, a QR code, radio frequency identifier (RFID), a serial number, and/or other human-readable or machine-readable information. In some implementations, a key may be an alphanumerical code. In some implementations, individual physical items may be associated with a pair of keys that include a public key and a private key. In some implementations, the keys may include cryptographic keys. In some implementations, a pair of keys may form a cryptographic keypair. In some implementations, public keys may be visually and/or publicly available and/or observable. For example, in some implementations, observers may observe public keys. For example, in some implementations, observers may observe public keys of particular physical items without being the owners of those items. For example, in some implementations, observers may obtain particular public keys by observing the packaging of particular physical items, the exterior of the particular physical items, and/or other publicly visible information related to the particular physical items.

In some implementations, private keys may not be visually and/or publicly available and/or observable. In some implementations, the first time a private key may be visually and/or publicly available and/or observable is for the owner of the particular physical item, e.g., subsequent to purchasing the particular physical item. For example, in some implementations, most users cannot observe a private key, but the owner of a particular physical item can observe the associated private key (or at least be the first person to observe the associated private key). In some implementations, a private key may be included inside the packaging of a physical item, on the exterior of the physical item, and/or as information that is visible to the owner of the physical item. For example, a private key may be revealed by scratching off a layer that hides the information of the private key.

For example, a particular physical item may be associated with a particular pair of keys. The pair of keys may include one or more alphanumerical keys. The pair of keys may include a public key and a private key. Observers may observe the public key of the particular physical item without being the owners of that item. For example, in some implementations, observers may obtain the particular public key by observing the packaging of the particular physical item, the exterior of the particular physical item, and/or other publicly visible information related to the particular physical item. The public key may be visually publicly available. The private key may be not visually publicly available. The private key may be available to an owner of the particular physical item. The private key of the particular physical item may be hidden from public view such that an observer cannot (legally) obtain the private key, by observing one or both of a packaging of the particular physical item and an exterior of the particular physical item, without being the owner of the particular physical item. Verification of the activation status of the particular physical item (i.e., whether the particular physical item is activated or not activated) may be based on the public key. The activation of the particular physical item (i.e., a transition from non-activated status to activated status) may be based on the private key.

By way of non-limiting example, FIG. 4A illustrates an exemplary packaging 400 for a toy vehicle (e.g., a racecar) that includes, on the outside of the package, a depiction 401 of the toy vehicle inside, a public key 402 (depicted as an alphanumerical code), and a public key 403 (depicted as a QR code, which may represent the same key as public key 402). Prior to this packaging 400 (and its contents) being sold to a user (or otherwise being obtained by the user), public key 402 and public key 403 may be publicly visible and/or observable. Any user could read public key 402 or scan public key 403, even if packaging 400 is still on the shelf (prior to being sold, for example). These users do not need to own or purchase packaging 400 (and its contents) to observe and/or otherwise obtain the public key associated with the toy vehicle inside packaging 400. By way of non-limiting example, FIG. 4B illustrates a side view 460 of a toy vehicle 450 (which may have been inside the packaging depicted in FIG. 4A). A user would need to purchase and/or otherwise obtain toy vehicle 450 in order to observe the details of toy vehicle 450 (or anything else within the packaging of toy vehicle 450). By way of non-limiting example, FIG. 4C illustrates a bottom view 461 of toy vehicle 450 (which may have been inside the packaging depicted in FIG. 4A). A user would need to purchase and/or otherwise obtain toy vehicle 450 in order to observe the details on the bottom of toy vehicle 450. As depicted, a private key 462 (depicted as an alphanumerical code), and a private key 463 (depicted as a QR code, which may represent the same private key as private key 462) are provided on the bottom surface of toy vehicle 450.

Referring to FIG. 1, user managing component 110 may be configured to manage user accounts for the users in the online gaming platform. Individual ones of the user accounts may be associated with individual ones of the users. The individual ones of the user accounts may include individual user inventories of virtual items that are usable within online gaming platform 105 by the individual ones of the users. The first user may be associated with a first user account, the second user may be associated with a second user account, and so forth. The first user account may include a first user inventory of one or more virtual items that are usable by the first user within online gaming platform 105, the second user account may include a second user inventory of one or more virtual items that are usable by the second user within online gaming platform 105, and so forth. In some implementations, access to a particular user account may require a user-account-specific private key.

Request component 112 may be configured to receive requests from users and/or from components of system 100. In some implementations, the received requests may include requests from users for the activation status of particular physical items. In some implementations, the received requests may include requests from users to verify whether particular physical items have been activated. In some implementations, an individual request may include a uniform resource locator (URL). In some implementations, an individual request may be embedded in a URL (e.g., accessing a particular URL may imply an individual request to verify whether a particular physical item has been activated). In some implementations, an individual request may include a particular (alphanumerical) public key. For example, a first request regarding a first physical item may include a first public key that is associated with the first physical item. In some implementations, requests for activation status may be received from any user, since the public key may be publicly available. In some implementations, a particular request for activation status may need to include a user-account-specific private key or a user-specific private key, such that the user provides authentication with the particular request.

In some implementations, request component 112 may be configured to receive requests to effectuate particular activations of particular physical items and to unlock particular virtual content and/or otherwise make it accessible to one or more users. In some implementations, such requests may include one or more private keys. In some implementations, such requests may include both public and private keys (i.e., pairs of keys). In some implementations, an individual request may be embedded in a URL (e.g., accessing a particular URL may imply an individual request to effectuate a particular activation of a particular physical item). In some implementations, the individual request may include a particular (alphanumerical) private key. For example, a request regarding a first physical item may include a first private key that is associated with the first physical item. In some implementations, requests for particular activations may be received from the specific user who is the owner of a particular item, since the private key may be available only to the owner. In some implementations, a particular request for activation of a physical item may need to include a user-account-specific private key or a user-specific private key, such that the user provides authentication with the particular request. For example, the particular request may include two private keys: a first private key that is associated with a particular physical item, and a second private key that is user-specific and/or user-account-specific. In some implementations, a single request received by request component 112 may include effectuate both a verification of activation status and an activation of a particular physical item if the particular physical item has not yet been activated.

Activation determination component 114 may be configured to determine whether activations of physical items have occurred. For example, activation determination component 114 may be configured to determine whether a first activation of a first item has occurred, and/or what the activation status of the first item is. In some implementations, determinations by activation determination component 114 may include accessing one or more smart contracts on decentralized database 144. Accessing the smart contract may include reading all or part of the state of the smart contract. The state of the smart contract may include one or more variables. Accessing the smart contract may include invoking a function of the smart contract. The function may return a value, including but not limited to the value of a particular variable. In some implementations, an individual physical item may be associated with an individual smart contract, having individual state. A particular value of a particular variable of the individual state may represent the activation status. The function may return the particular value of the particular variable that represents the activation status. The function may be read-only, so the activation status is not changed by virtue of invoking the particular function. In some implementations, multiple physical items may be associated with an individual smart contract, having individual state. In some implementations, the function may take one or more arguments, including but not limited to a public key and/or other information.

Notification component 116 may be configured to generate and/or transmit notifications. In some implementations, operations by notification component 116 may be performed responsive to particular determinations, e.g., by activation determination component 114. In some implementations, operations by notification component 116 may be performed responsive to receiving particular requests, e.g., by request component 112. For example, notification component 116 may be configured to, responsive to a determination that a particular activation of a particular item has not occurred, transmit a notification. The notification may be transmitted in reply to a particular request. For example, the notification may indicate that the particular activation of the particular item has not occurred. For example, a different notification may indicate that a given activation of a given item has occurred. In some implementations, notification component 116 may be configured to, responsive to a particular virtual content being unlocked for and/or otherwise accessible to a particular user, transmit a notification (e.g., to the particular user) in reply to a request. For example, the notification may indicate the particular virtual content is accessible to the particular user. In some implementations, for particular virtual content that can only be unlocked once, a subsequent request for activation (or attempt to unlock the previously unlocked particular virtual content) should fail, and a corresponding notification may be generated and transmitted.

State modification component 118 may be configured to modify smart contracts on decentralized database 144. In some implementations, modifying a smart contract may include modifying the state of the smart contract. For example, a modification may include a change in one or more values of one or more variables of the smart contract. In some implementations, a modification may be effectuated through invoking a function of the smart contract. For example, prior to a particular modification, a function call to read the activation status of a particular physical item might return a first value, whereas subsequent to the particular modification, a second function call to read the activation status of the particular physical item may return a second value that is different from the first value.

In some implementations, modifying (the state of) a smart contract may include recording a transaction on decentralized database 144 that modifies a particular address (or the value of a particular variable) in the smart contract. For example, an address stored in the smart contract may identify a user account on decentralized database 144, and a stored address may represent ownership and/or other rights associated with the smart contract as belonging to a particular user account. In some implementations, modifying the state of the smart contract may include invoking a function of the smart contract with a private key as an argument. In some implementations, a particular modification of the state of the smart contract may be performed such that the particular modified state (e.g., the value of a particular variable that represents the activation status of a particular physical item) cannot be reverted or modified to undo the particular modification (e.g., once the value of the particular variable has been modified to represent that the particular physical item has been activated, the value of this variable cannot be changed again). In some implementations, operations by state modification component 118 may be performed responsive to particular determinations, e.g., by activation determination component 114. In some implementations, operations by state modification component 118 may be performed responsive to receiving particular requests, e.g., by request component 112. For example, a particular modification of the state of a smart contract may be performed responsive to a determination that a particular private key included in a request is associated with a particular physical item.

Link component 120 may be configured to establish links and/or other connections between physical items and users (or user accounts). In some implementations, link component 120 may be configured to establish links and/or other connections between virtual content and users (or user accounts). For example, a particular link and/or connection may be based, at least in part, on an association between a physical item and particular virtual content. In some implementations, an established link may be between an association (which is between a physical item and particular virtual content) and a user (or user account). In some implementations, subsequent to a link being established, a particular user may be able to access particular virtual content. For example, particular virtual content may have a user-specific locking mechanism, and by virtue of establishing a particular link or connection, the particular virtual content may be unlocked for a particular user. In some implementations, operations by link component 120 may be performed responsive to particular determinations, e.g., by activation determination component 114. In some implementations, operations by link component 120 may be performed responsive to receiving particular requests, e.g., by request component 112.

Figure 3:
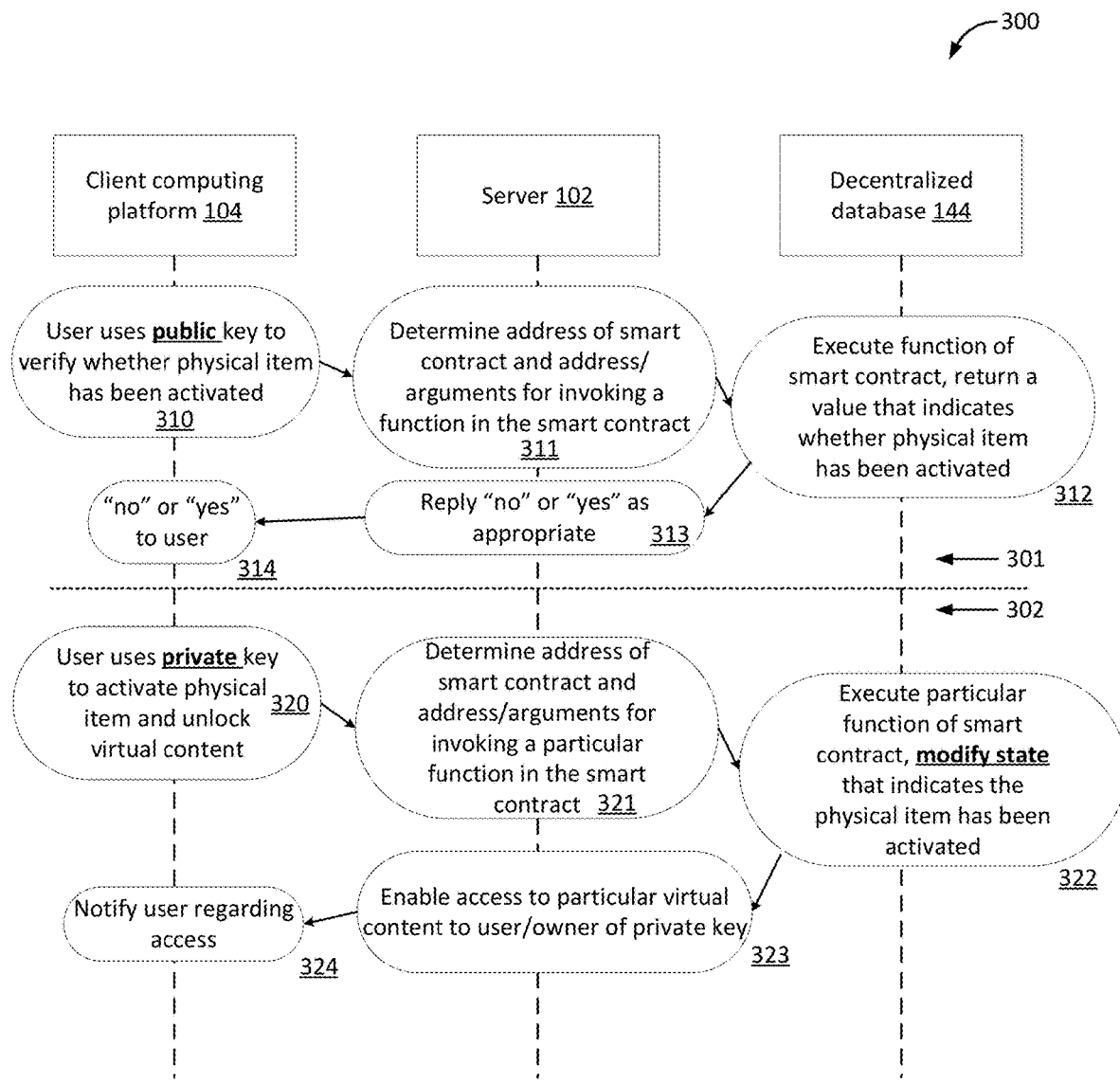
FIG. 3 illustrates exemplary transactional diagrams depicting transactions as may be used by a system configured for linking physical items to virtual content, in accordance with one or more implementations.

By way of non-limiting example, FIG. 3 illustrates an overview 300 of exemplary transactions 301 and 302 as may be used by system 100. In transaction 301, an action 310 may be initiated at client computing platform 104, and represents a request by a user to verify whether a particular physical item has been activated. This request may include a public key. The request may be transmitted to server 102. At server 102, an action 311 may be performed, which may include a determination of an address of a particular smart contract on decentralized database 144, followed by a function call to the smart contract, using the public key as an argument to the function. At decentralized database 144, an action 312 may be performed, which may include execution the function of the smart contract, and returning a value that represents whether the physical item has been activated (as recorded in the smart contract). The pertinent value is returned to server 102 in action 313, and subsequently notified to the user in action 314.

In transaction 302, an action 320 may be initiated at client computing platform 104, and represents a request by a user to activate a particular physical item. This request may include a private key. The request may be transmitted to server 102. At server 102, an action 321 may be performed, which may include a determination of an address of a particular smart contract on decentralized database 144, followed by a function call to the smart contract, using the private key as an argument to the function. At decentralized database 144, an action 322 may be performed, which may include execution the function of the smart contract, and modifying particular state of the smart contract that represents the physical item has been activated (as recorded in the smart contract). A pertinent value is returned to server 102 in action 323, effectuating that server 102 enables access to particular virtual content for the user that made the request in action 320 (presumably the owner of the activated physical item and its private key). Subsequently the user is notified in action 324 regarding access to the particular virtual content.

Referring to FIG. 1, in some implementations, server(s) 102, client computing platform(s) 104, and/or external resources 122 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

A given client computing platform 104 may include one or more processors configured to execute computer program components. The computer program components may be configured to enable an expert or user associated with the given client computing platform 104 to interface with system 100 and/or external resources 122, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some implementations, some or all of the functionality attributed herein to external resources 122 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute components 108, 110, 112, 114, 116, 118, and/or 120, and/or other components. Processor(s) 126 may be configured to execute components 108, 110, 112, 114, 116, 118, and/or 120, and/or other components by software; hardware; firmware; some combination of software, hardware, and/or firmware; and/or other mechanisms for configuring processing capabilities on processor(s) 126. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, and/or 120 are illustrated in FIG. 1 as being implemented within a single processing unit, in implementations in which processor(s) 126 includes multiple processing units, one or more of components 108, 110, 112, 114, 116, 118, and/or 120 may be implemented remotely from the other components. The description of the functionality provided by the different components 108, 110, 112, 114, 116, 118, and/or 120 described below is for illustrative purposes, and is not intended to be limiting, as any of components 108, 110, 112, 114, 116, 118, and/or 120 may provide more or less functionality than is described. For example, one or more of components 108, 110, 112, 114, 116, 118, and/or 120 may be eliminated, and some or all of its functionality may be provided by other ones of components 108, 110, 112, 114, 116, 118, and/or 120. As another example, processor(s) 126 may be configured to execute one or more additional components that may perform some or all of the functionality attributed below to one of components 108, 110, 112, 114, 116, 118, and/or 120.

Figure 2:
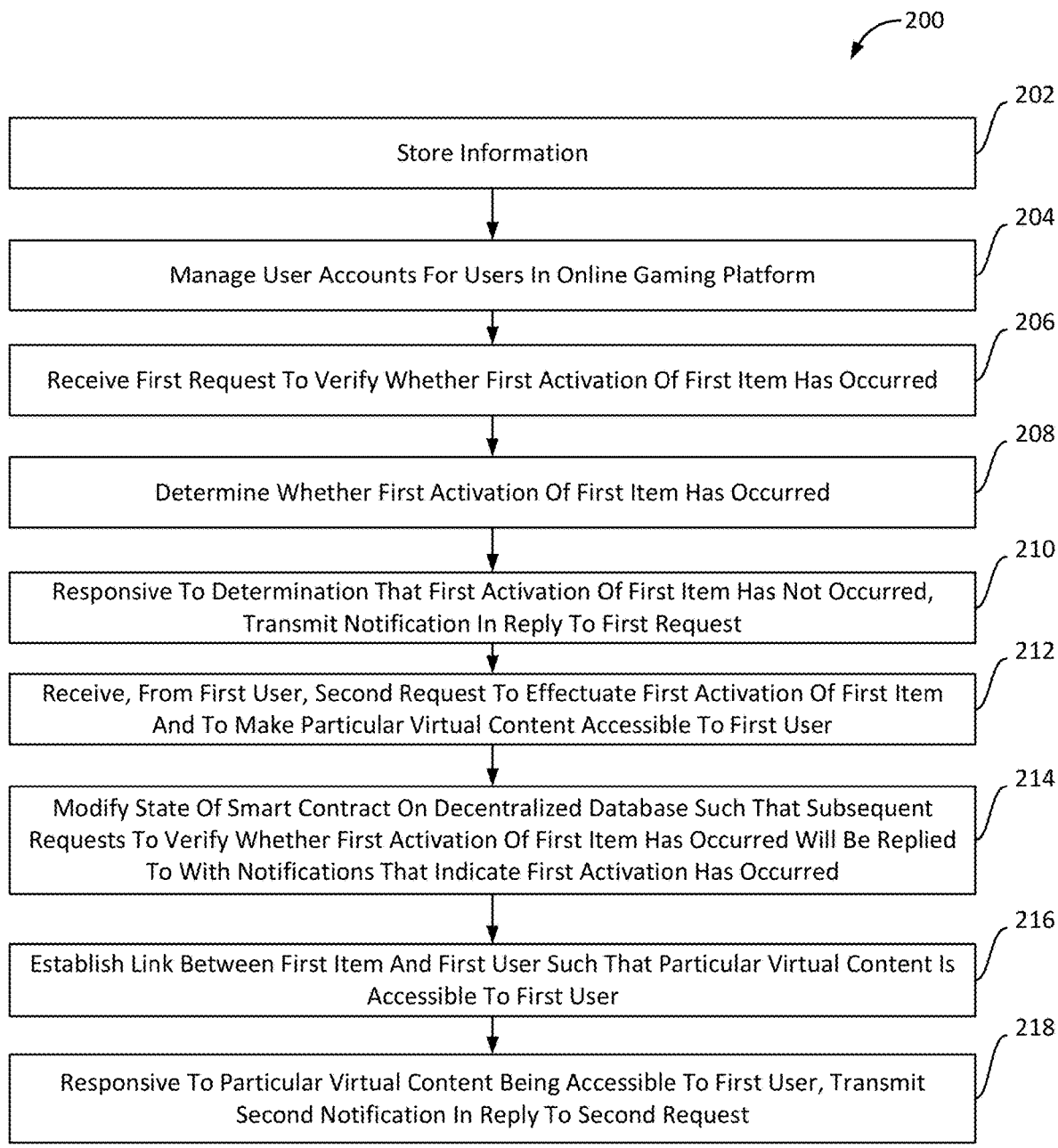
FIG. 2 illustrates a method for linking physical items to virtual content, in accordance with one or more implementations.

FIG. 2 illustrates a method 200 for linking physical items to virtual content, wherein the physical items include a first item, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing information. The stored information may include an association between the first item and particular virtual content that is usable to one or more users in the online gaming platform upon a first activation of the first item. The first item may be associated with a pair of alphanumerical keys. The pair of alphanumerical keys may include a public key and a private key. The public key may be visually publicly available. The private key may be not visually publicly available. The private key may be available to an owner of the first item. The first activation may be based on the private key. Operation 202 may be performed by one or more hardware processors configured by machine-readable instructions including a component that is the same as or similar to information storing component 108, in accordance with one or more implementations.

An operation 204 may include managing user accounts for the users in the online gaming platform. Individual ones of the user accounts may be associated with individual ones of the users. The individual ones of the user accounts may include individual user inventories of virtual items that are usable within the online gaming platform by the individual ones of the users. The users may include a first user. The first user may be associated with a first user account. The first user account may include a first user inventory of one or more virtual items that are usable by the first user within the online gaming platform. Operation 204 may be performed by one or more hardware processors configured by machine-readable instructions including a component that is the same as or similar to user managing component 110, in accordance with one or more implementations.

An operation 206 may include receiving a first request to verify whether the first activation of the first item has occurred. The first request may include the public key. Operation 206 may be performed by one or more hardware processors configured by machine-readable instructions including a component that is the same as or similar to request component 112, in accordance with one or more implementations.

An operation 208 may include determining whether the first activation of the first item has occurred. Determination may include accessing a smart contract on a decentralized database. Operation 208 may be performed by one or more hardware processors configured by machine-readable instructions including a component that is the same as or similar to activation determination component 114, in accordance with one or more implementations.

An operation 210 may include responsive to a determination that the first activation of the first item has not occurred, transmitting a notification in reply to the first request. The notification may indicate that the first activation of the first item has not occurred. Operation 210 may be performed by one or more hardware processors configured by machine-readable instructions including a component that is the same as or similar to notification component 116, in accordance with one or more implementations.

An operation 212 may include receiving, from the first user, a second request to effectuate the first activation of the first item and to make the particular virtual content accessible to the first user. The second request may include the private key. Operation 212 may be performed by one or more hardware processors configured by machine-readable instructions including a component that is the same as or similar to request component 112, in accordance with one or more implementations.

An operation 214 may include modifying state of the smart contract on the decentralized database such that subsequent requests to verify whether the first activation of the first item has occurred will be replied to with notifications that indicate the first activation has occurred. Operation 214 may be performed by one or more hardware processors configured by machine-readable instructions including a component that is the same as or similar to state modification component 118, in accordance with one or more implementations.

An operation 216 may include establishing a link between the first item and the first user such that the particular virtual content is accessible to the first user. Establishment of the link may be based on the association between the first item and the particular virtual content. Operation 216 may be performed by one or more hardware processors configured by machine-readable instructions including a component that is the same as or similar to link component 120, in accordance with one or more implementations.

An operation 218 may include responsive to the particular virtual content being accessible to the first user, transmitting a second notification in reply to the second request. The second notification may indicate the particular virtual content is accessible to the first user. Operation 218 may be performed by one or more hardware processors configured by machine-readable instructions including a component that is the same as or similar to notification component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for linking physical items to virtual content, wherein a first physical item of the physical items is associated with a pair of keys, wherein the pair of keys include a public key and a private key, wherein the public key is visually publicly available, wherein the private key is not visually publicly available, wherein the private key is available to an owner of the first physical item, wherein the virtual content is unlocked for users in an online gaming platform upon activation of the first physical item, the system comprising:
electronic storage configured to store information, wherein the stored information includes an association between the first physical item and particular virtual content, wherein the particular virtual content is unlocked in the online gaming platform upon a first activation of the first physical item, wherein the first activation requires provision of the private key; and one or more processors configured by machine-readable instructions to:

manage user accounts for the users in the online gaming platform, wherein individual ones of the user accounts are associated with individual ones of the users, wherein the individual ones of the user accounts include individual user inventories of virtual items that are usable within the online gaming platform by the individual ones of the users, wherein the users include a first user, wherein the first user is associated with a first user account, and wherein the first user account includes a first user inventory of one or more virtual items that are usable by the first user within the online gaming platform;

receive a first request to verify whether the first activation of the first physical item has occurred, wherein the first request includes the public key;

determine whether the first activation of the first physical item has occurred, wherein determination includes accessing a smart contract on a decentralized database;

responsive to a determination that the first activation of the first physical item has not occurred, transmit a notification in reply to the first request, wherein the notification indicates that the first activation of the first physical item has not occurred;

receive, from the first user, a second request to effectuate the first activation of the first physical item and to unlock the particular virtual content for the first user, wherein the second request includes the private key;

effectuate the first activation of the first physical item and unlock the particular virtual content by modifying a state of the smart contract on the decentralized database, wherein modification of the state of the smart contract includes invoking a function of the smart contract with the private key as an argument, such that subsequent requests to verify whether the first activation of the first physical item has occurred will be replied to with notifications that indicate the first activation of the first physical item has occurred;

establish a link between the first physical item and the first user such that the particular virtual content is unlocked for the first user, wherein establishment of the link is based on the association between the first physical item and the particular virtual content; and responsive to the particular virtual content being unlocked for the first user, transmit a second notification in reply to the second request, wherein the second notification indicates the particular virtual content is unlocked for the first user.

2. The system of claim 1, wherein the public key of the first physical item is depicted on one or both of a packaging of the first physical item and an exterior of the first physical item such that an observer can obtain the public key without being the owner of the first physical item by observing one or both of the packaging and the exterior.

3. The system of claim 1, wherein the private key of the first physical item is hidden from public view such that an observer cannot legally obtain the private key, by observing one or both of a packaging of the first physical item and an exterior of the first physical item, without being the owner of the first physical item.

4. The system of claim 1, wherein modifying the state of the smart contract includes recording a transaction on the decentralized database that modifies a particular address in the smart contract.

5. The system of claim 1, wherein the modification of the state of the smart contract is irreversible.

6. The system of claim 1, wherein the first request is embedded in a uniform resource locator (URL).

7. The system of claim 1, wherein accessing the smart contract includes reading all or part of the state of the smart contract.

8. The system of claim 1, wherein the particular virtual content includes one or both of a virtual item usable within the online gaming platform and an activity, event, or area within a virtual space of the online gaming platform.

9. The system of claim 1, wherein modifying the state of the smart contract is performed such that the modified state cannot be reverted to be unmodified.

10. The system of claim 1, wherein modifying the state of the smart contract is performed responsive to a determination that the private key included in the second request is associated with the first physical item.

11. A method for linking physical items to virtual content, wherein the physical items include a first physical item, the method comprising:

storing information, wherein the stored information includes an association between the first physical item and particular virtual content, wherein the particular virtual content is unlocked for to one or more users in the online gaming platform upon a first activation of the first physical item, wherein the first physical item is associated with a pair of keys, wherein the pair of keys include a public key and a private key, wherein the public key is visually publicly available, wherein the private key is not visually publicly available, wherein the private key is available to an owner of the first physical item, wherein the first activation is based on the private key;

managing user accounts for the users in the online gaming platform, wherein individual ones of the user accounts are associated with individual ones of the users, wherein the individual ones of the user accounts include individual user inventories of virtual items that are usable within the online gaming platform by the individual ones of the users, wherein the users include a first user, wherein the first user is associated with a first user account, and wherein the first user account includes a first user inventory of one or more virtual items that are usable by the first user within the online gaming platform;

receiving a first request to verify whether the first activation of the first physical item has occurred, wherein the first request includes the public key;

determining whether the first activation of the first physical item has occurred, wherein determination includes accessing a smart contract on a decentralized database;

responsive to a determination that the first activation of the first physical item has not occurred, transmitting a notification in reply to the first request, wherein the notification indicates that the first activation of the first physical item has not occurred;

receiving, from the first user, a second request to effectuate the first activation of the first physical item and to unlock the particular virtual content for the first user, wherein the second request includes the private key;

effectuating the first activation of the first physical item and unlocking the particular virtual content by modifying a state of the smart contract on the decentralized database, wherein modification of the state of the smart contract includes invoking a function of the smart contract with the private key as an argument, such that subsequent requests to verify whether the first activation of the first physical item has occurred will be replied to with notifications that indicate the first activation of the first physical item has occurred;

establishing a link between the first physical item and the first user such that the particular virtual content is unlocked for the first user, wherein establishment of the link is based on the association between the first physical item and the particular virtual content; and responsive to the particular virtual content being unlocked for the first user, transmitting a second notification in reply to the second request, wherein the second notification indicates the particular virtual content is unlocked for the first user.

12. The method of claim 11, wherein the public key of the first physical item is depicted on one or both of a packaging of the first physical item and an exterior of the first physical item such that an observer can obtain the public key without being the owner of the first physical item by observing one or both of the packaging and the exterior.

13. The method of claim 11, wherein the private key of the first physical item is hidden from public view such that an observer cannot legally obtain the private key, by observing one or both of a packaging of the first physical item and an exterior of the first physical item, without being the owner of the first physical item.

14. The method of claim 11, wherein modifying the state of the smart contract includes recording a transaction on the decentralized database that modifies a particular address in the smart contract.

15. The method of claim 11, wherein the modification of the state of the smart contract is irreversible.

16. The method of claim 11, wherein the first request is embedded in a uniform resource locator.

17. The method of claim 11, wherein accessing the smart contract includes reading all or part of the state of the smart contract.

18. The method of claim 11, wherein the particular virtual content includes one or both of a virtual item usable within the online gaming platform and an activity, event, or area within a virtual space of the online gaming platform.

19. The method of claim 11, wherein modifying the state of the smart contract is performed such that the modified state cannot be reverted to be unmodified.

20. The method of claim 11, wherein modifying the state of the smart contract is performed responsive to a determination that the private key included in the second request is associated with the first physical item.

* * * * *